United States Patent [19]

Ohashi et al.

[11] Patent Number: 4,847,742
[45] Date of Patent: Jul. 11, 1989

[54] MULTI-CHANNEL INVERTER CIRCUIT
[75] Inventors: Shin-ichi Ohashi, Chigasaki; Isao Fukushima, Katsuta, both of Japan
[73] Assignees: Hitachi Video Engineering, Inc.; Hitachi, Ltd., both of Tokyo, Japan
[21] Appl. No.: 153,209
[22] Filed: Feb. 8, 1988
[30] Foreign Application Priority Data
  Feb. 12, 1987 [JP] Japan .................................. 62-28088
  Apr. 3, 1987 [JP] Japan .................................. 62-80937
  May 22, 1987 [JP] Japan .............................. 62-124026
[51] Int. Cl.$^4$ ........................................... H02M 3/335
[52] U.S. Cl. ......................................... 363/21; 363/70
[58] Field of Search ....................... 363/16, 21, 25, 26, 363/70

[56] References Cited
U.S. PATENT DOCUMENTS
4,034,232  7/1977 La Ventura ........................... 363/25
4,055,790 10/1977 Garding et al. ....................... 363/25
4,122,514 10/1978 Amin ..................................... 363/21
4,672,516  6/1987 Ney et al. ............................. 363/16

FOREIGN PATENT DOCUMENTS
54-140153 10/1979 Japan .

OTHER PUBLICATIONS
Shin-ichi Ohashi, "Multi-Channeling of Switching Inverters by Adaptive Switching Network", pp. 1-5.

Primary Examiner—Patrick R. Salce
Assistant Examiner—J. Sterrett
Attorney, Agent, or Firm—Fay, Sharpe, Beall, Fagan, Minnich & McKee

[57] ABSTRACT

The invention is to provide a more economical and practical multi-channel inverter with reference particularly to a modulation process of the time width, wherein a DC output is fed to each of a multiplicity of output channel circuits through time division to a multi-channeling, each of the time widths is modulated pertinently according to each output, thereby obtaining DC and AC multi-channel outputs independently of each other between said channels.

9 Claims, 15 Drawing Sheets

MULTI-CHANNEL INVERTER CIRCUIT

BACKGROUND OF THE INVENTION

This invention relates to a system including a motor and other actuator driving power amplifiers other than a circuit system, and is particularly concerned with a circuit for compounding functions of DC power, DC amplification and AC amplification for, improving the motor power efficiency and thus preferably for realizing miniaturization and lighter weight requirements and also for enhancing economical efficiency of the system as a whole.

In a prior art DC to DC converter, a great interest has been taken particularly in a stabilization of a plurality of DC outputs as disclosed in Japanese Patent Laid-Open No. 140153/1979 and also illustrated in FIG. 5-16, p. 154 to FIG. 5-20, p. 157 representing examples of a multi-power circuit given in Paragraph 5.4, "Know-how on Engineering Switching Regulator" by Hasegawa, Published by CQ Publishing Co. Roughly speaking, however, a power unit and an amplifier and other apparatuses operating from a power fed from the supply are fabricated separately from each other in a conventional design and development, and an improvement has been provided in each field accordingly. Consequently, there is no unifying idea common to both systems the two and thus to regard as a new system to improvement like the invention. That is, the prior art DC to DC converter described as above is used exclusively for obtaining direct current or pulsating current output. The multi-channel outputting is only to obtain a plurality of supply DC outputs, and outputs modulated independently from other outputs. Another modulating DC to DC converter or inverter or power amplifier and the like is connected further to output side. Accordingly, when modulating a multiplicity of output channels independently of each other, a drawback is inevitable such that the system enlarges in size entirely, and the cost increases considerably.

Further in the prior art, the output is limited only to a direct current, No consideration has been paid to outputting an alternating current instead of the direct current output, and thus a power circuit is intended only as direct current output power.

Still further, there is a problem resulting with the known example described in the foregoing Japanese Patent Laid-Open No. 140153/1979 as referred to in FIG. 1.

That is, in FIG. 1, a DC voltage is impressed on a primary coil inductance (hereinafter shortened to "primary inductance") 2-1 of a transformer 2 from a primary supply 1 through a switching element 3 such as a transistor or the like. The switching element 3 operates in an on/off manner according to a switching control circuit 13, and a voltage pulse is generated on secondary coil inductances (hereinafter shortened to "secondary inductances") 2-2, 2-3 of the transformer 2 at a duty ratio equal to the on/off duty ratio of the switching element 3. An amplitude of the voltage pulse is determined on a winding ratio of the primary coil 2-1 to the secondary coils 2-2, 2-3. The voltage pulse generated on the secondary coil 2-2 is rectified by a diode 4-1, smoothed by a capacitor 5-1 to a DC voltage, and is fed to a load 6 or a circuit system, for example, as power supply voltage. Then, the voltage pulse generated on the secondary coil 2-3 is also rectified by a diode 4-2, smoothed by a capacitor 5-2 to a DC voltage, and is fed to a servo circuit 8 controlling a servomotor 7 as a supply voltage. The ratio of a power supply voltage impressed on the load 6 to the supply voltage impressed on the servo circuit 8 is determined on a winding ratio of the secondary coils 2-2, 2-3 of the transformer 2. The servo circuit 8 makes a voltage impressed on the servomotor 7 variable according to a control signal from an input terminal 9, thus controlling rotational quantity, rotational speed and others of the servomotor 7.

Meanwhile, a supply voltage impressed on the load 6 or circuit system must be constant, and even if the voltage impressed on the servomotor 7 is made variable, a supply voltage impressed on the load including the servomotor 7 and the servo circuit 8 must also be constant.

Now, therefore, the supply voltage impressed on the servo circuit 8 is also fed to an error amplifier 10 and compared with a reference voltage from a reference supply 11 with an amplitude equal to the amplitude to be set by the supply voltage. If there is a difference between the two, then the error voltage is fed to a switching control circuit 13 through a coupling element 12 consisting of photocoupler, transformer and other elements. The switching control circuit 13 changes the on/off duty ratio of the switching element 3 according to the error voltage. Thus, the supply voltage impressed on the servo circuit 8 is fixed to a normal amplitude, and the supply voltage impressed on the load 6 constant in ratio therewith is also fixed to a normal amplitude.

Then, an amplitude of the reference voltage of the reference supply 11 will be set equal to the normal amplitude of the supply voltage impressed on the load 6, and the reference voltage may be compared with the supply voltage impressed on the load 6 by the error amplifier 10.

Thus the above-described prior art comprises regulating output supply voltages to each load so as not to fluctuate unevenly but to stabilize equally. As the load, the supply voltage must not only be kept constant at all times like a circuit system but may also be changed, as occasion demands, to a control action. For example, in the case of servomotor 7 of FIG. 1, the supply voltage will be made controllable on a control signal and if the supply voltage can be impressed directly on the motor 7, then the servo circuit 8 with a heavy power consumption can be omitted.

However, in the prior art shown in FIG. 1, since each output supply voltage is kept constant, a servo circuit with heavy power consumption will be required for the load for which an impressed voltage must be made variable, and thus while a power loss in the power circuit is to be decreased by a switching operation, a construction to increase the power loss on a load is quite unavoidable.

SUMMARY OF THE INVENTION

One object of the present invention is to obtain independent DC and AC multi-channel outputs by time dividing an output of a conventional single DC to DC converter, feeding it to each of a multiplicity of output channels to for multi-channeling and divided output, and selectively, modulating each divided time width pertinently according to each output concurrently. The object relates particularly to a modulation process of the time width to provide a more economical and also more practical output supply voltage. The object may be attained by distributing an output of a DC to DC converter (switching regulator power circuit) to a plurality of loads through a switching circuit, and controlling a switching time width of the switching circuit.

Another object of the present invention is to provide an AC power amplifier satisfactory in power efficiency through converting a secondary output of the multi-channel into alternating current, and also to provide a switching device for obtaining a secondary output of the multi-channel, having a multi-channel function with the aforementioned AC function added to a conventional DC output function to an independent compound function.

Then, the aforementioned conversion of output into an alternating current may be attained by changing a polarity of the switching power output according to the polarity of an AC input signal, and also the multi-channeling may be attained by sampling the input signal of each channel on time division, and driving each channel according to the value.

Further in the present invention, a means for controlling the length of ON interval of the switching element according to output voltage at every channels is provided so as to change output voltages of each channel independently and thus to remove a mutual interference between the output supply voltages.

DESCRIPTION OF THE PREFERRED EMBODIMENT

Figure 1:
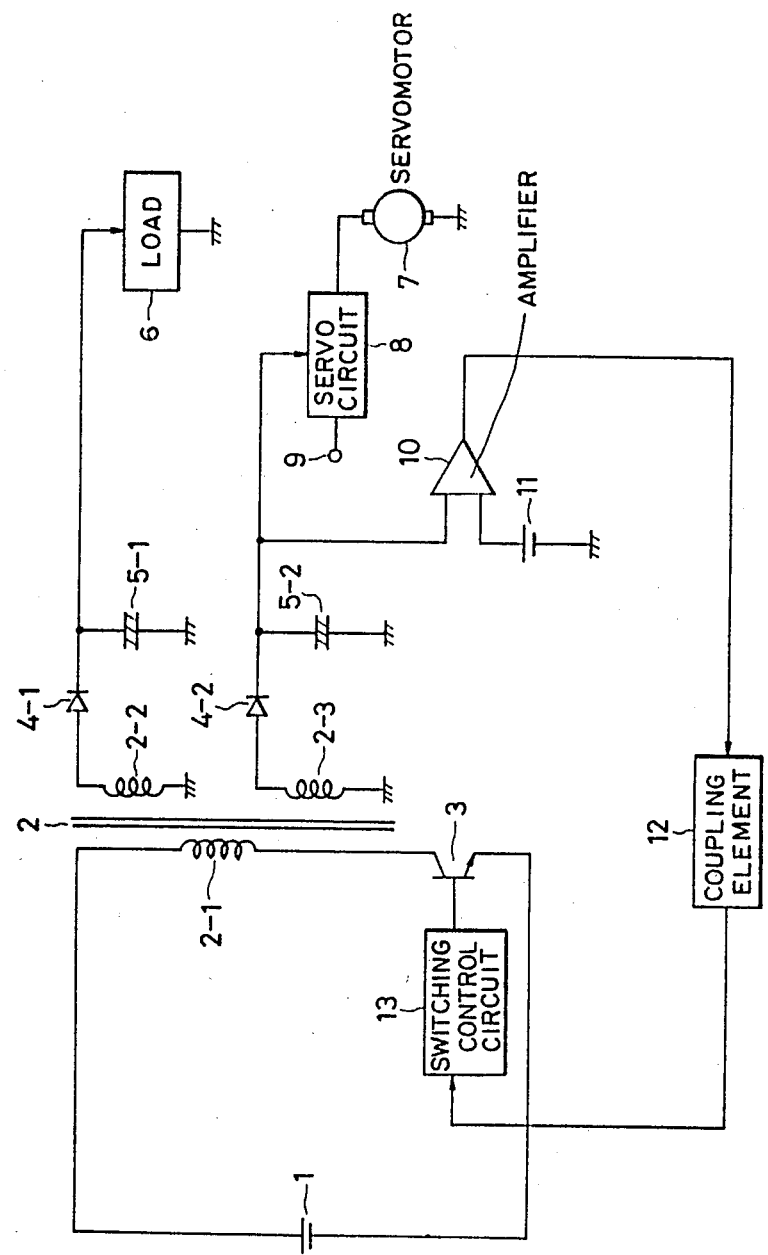
FIG. 1 is a block diagram representing one example of a prior art multi-channel inverter circuit.
Figure 2A:
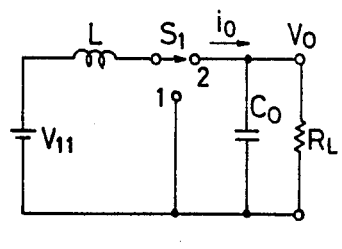
FIG. 2a, FIG. 2b, FIG. 3a and FIG. 3b are principle circuit diagrams and operational drawings for illustrating the present invention.
Figure 2B:
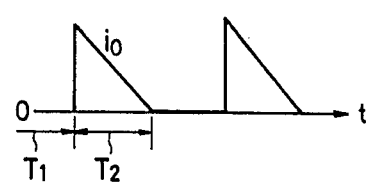
Figure 3A:
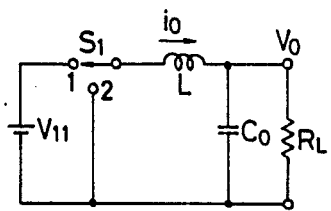

Referring first to all DC to DC converters to which the invention can be applied, these can be examlified in two kinds of circuit configurations shown in FIG. 2a and FIG. 3a in principle. In both drawings, an output current $i_0$ flows to a load circuit consisting of a smoothing capacitor $C_0$ and a load $R_L$ from a primary supply $V_{11}$ through an inductance L and a switch $S_1$. Operations of FIGS. 2a, 2b and FIGS. 3a, 3b are the same in principle, therefore FIGS. 2a, 2b will be taken up for description. The inductance L functions to receive energy from the input $V_{11}$ during a term $T_1$ in which the switch $S_1$ touches a contact $S_1$-1 to discharge the energy toward an output $V_0$ during a term $T_2$ in which the switch $S_1$ touches a contact $S_1$-2. Accordingly, an energy quantity transferred to the inductance L varies from change in ON/OFF time width of the switch $S_1$, therefore the output $V_0$ also changes. That is, the output cannot be controlled without the inductance L.

Figure 4:
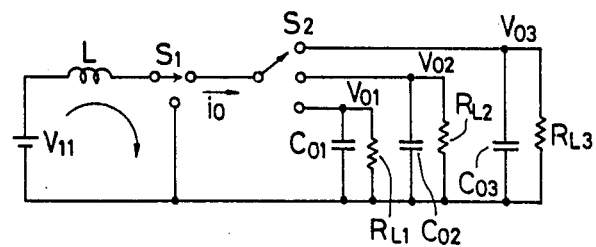
FIG. 4 is a basic circuit configuration drawing of one embodiment of the present invention.
Figure 5:
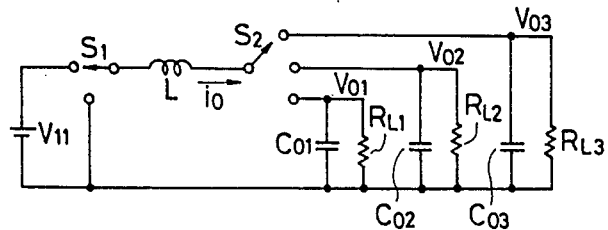
FIG. 5 is a basic circuit configuration drawing of another embodiment of the present invention.

Viewed from a working principle of such DC to DC inverter circuit, FIG. 2a will be modified to FIG. 4 and FIG. 3a will be modified to FIG. 5 likewise, the output current $i_0$ is distributed to a plurality of loads by a switch $S_2$, and thus a multi-channel output will be obtainable from controlling the ON time width in which the switch $S_2$ touches each contact, duty factor and so forth. However, a means for controlling particularly the switch $S_2$ properly will be necessary so as to control output voltages of each channel as in the case of the invention. Concurrently, the switch $S_1$ will have to be controlled for feeding power moderately to all loads. The invention achieves what is necessary for multi-channeling requirements.

Figure 6:
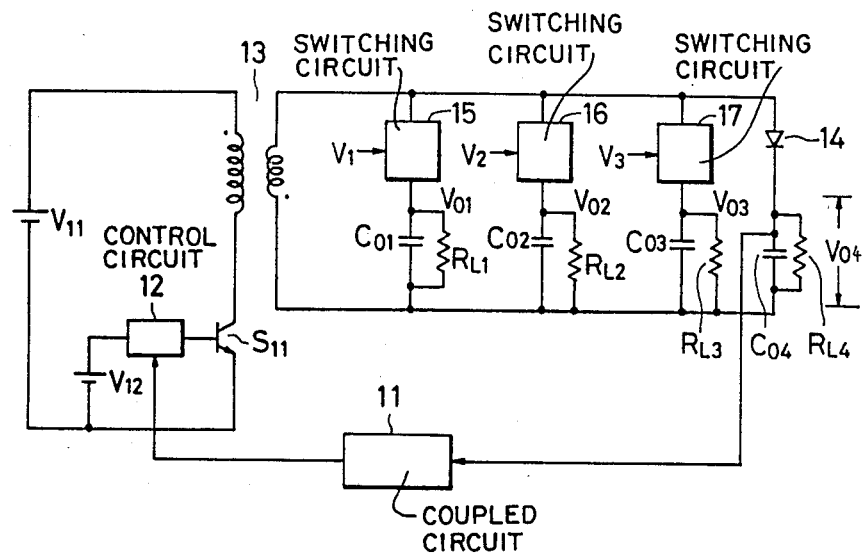
FIG. 6 is a circuit configuration drawing representing a further embodiment of the invention.

FIG. 6 gives one example of a basic construction of the invention, which is applied to a fly-back type. Switching circuits 15 to 17 correspond to the contacts of the switch $S_2$ respectively. $R_{L1}$ to $R_{L3}$ denote load impedances of each channel. $C_{01}$ to $C_{04}$ denote smoothing capacitors for smoothing output voltages $V_{01}$ to $V_{04}$ ON time widths of the switching circuits 15 to 17 are controlled by input signals $V_1$ to $V_3$ respectively. For example, the switching circuit 15 is conducts when the output voltage $V_{01}$ is lower than $V_1$, the capacitor $C_{01}$ is charged and the output voltage $V_{01}$ rises, and when $V_{01}$ exceeds $V_1$, it cuts off. Then, the switching circuit 15 is kept interrupted thereafter until the switching circuits 16, 17 and a diode 14 are conducted in sequence and cut off. Thus, the operation for conduction and interruption is repeated cyclically in sequence from the switching circuits 15 to 17 to the diode 14.

When the capacitors $C_{01}$ to $C_{03}$ are charged, a residual energy flows through the diode 14 to charge the capacitor $C_{04}$. Accordingly, the voltage $V_{04}$ of the capacitor $C_{04}$ may work as an index for indicating the quantity of energy necessary for charging all channels. Now, therefore, the output voltage $V_{04}$ is transferred to the control circuit 12 of a switching element $S_{11}$ through a coupled circuit 11, and a control loop for keeping the output voltage $V_{04}$ constant at all times is formed, thereby charging the capacitors $C_{01}$ to $C_{03}$ sufficiently at all times.

Described next are secondary switching circuits 15 to 17.

Figure 7:
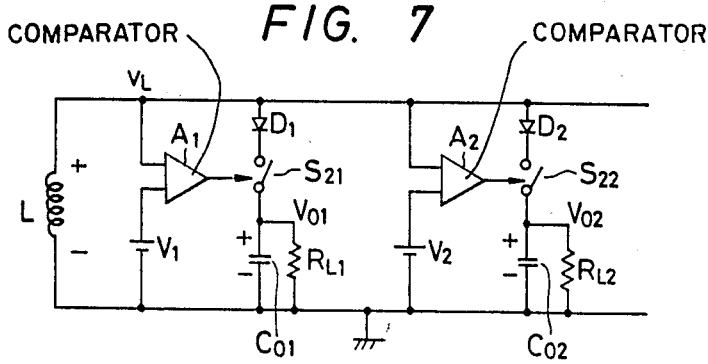
FIG. 7 is a view showing a principle circuit configuration of a switching circuit of FIG. 6.

FIG. 7 is a principle circuit configuration drawing thereof. As compared with FIG. 6, a primary side circuit and circuits coming after the switching circuit 7 are omitted as a matter of convenience. A reference character L denotes a secondary coil inductance. When the primary switch $S_{11}$ indicated in FIG. 6 is turned to OFF, a voltage $v_L$ of positive polarity is generated on the end L indicated in FIG. 7. If the voltage $v_L$ is less than the input voltage $V_1$, a comparator $A_1$ generates a signal for closing a switch $S_{21}$. The switch $S_{21}$ opens when the case is reverse. If the switch $S_{21}$ closes, then a current flows from the secondary coil inductance L through a diode $D_1$, the capacitor $C_{01}$ is thus charged, therefore the output voltage $V_{01}$ to rise. If a forward voltage of the diode $D_1$ is neglected, then since the switch $S_{21}$ is closed, the voltage $v_L$ is equal to the output voltage $V_{01}$. If the output voltage $V_{02}$ is greater than $V_{01}$, a diode $D_2$ is interrupted irrespective of operation of a switch $S_{22}$. An output of the comparator $A_1$ is inverted soon by a rise of the output voltage $V_{01}$ and thus cuts off the switch $S_{21}$. In this case, since the current is interrupted, the voltage $v_L$ rises to make the diode $D_2$ live. Accordingly, the voltage $v_L$ is clamped to the output voltage $V_{02}$, the capacitor $C_{02}$ is charged, and thus the switch $S_{22}$ is also turned to OFF. According to the operation mentioned above, the channels are conducting in sequence from that with the lowest input voltage to the channel with the highest input voltage. An ON time width of the switch $S_{21}$ is a period of time in which, for example, the output voltage $V_{01}$ reaches $V_1$, and which is determined automatically.

In epitomizing what is described above, the present invention can be applied to:

1. an output channel switching circuit for charging an output smoothing capacitor automatically by necessary quantity according to an input voltage,
2. a controlling system for monitoring a completion of charging of all output channels and adjusting a total feed energy pertinently, and
3. all DC to DC inverters.

In the principle circuits of the invention which are described with reference to FIG. 4, FIG. 5, FIG. 6 and FIG. 7, the multi-channel output circuits are fed automatically in sequence by necessary quantity and controlled for sufficient feeding quantity to all the channels, therefore the channel outputs can be controlled independently of each other.

Consequently, as described in the embodiment, it becomes easy to obtain an AC output from constructing the channel output circuit push-pull.

That is, the function can be extended to a multichannel channel unit including DC and AC amplification functions other than a stabilizing DC power source by applying the invention to the prior art DC to DC converter (switching power circuit).

A concrete circuit of an example of the output switching circuit used for the invention will now be described with reference to FIG. 8 and FIG. 9.

Figure 8:
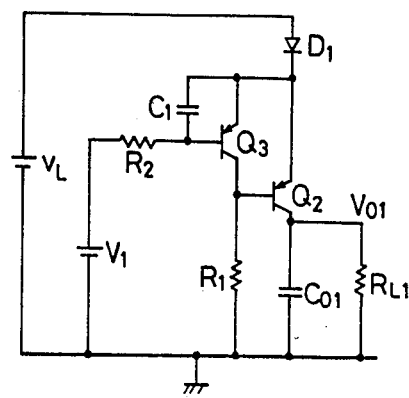
FIG. 8 is a view representing one concrete example of the switching circuit of the present invention.

FIG. 8 represents a concrete example of the output switching circuit. As a matter of convenience, a forward voltage ($0.7^v$ approximately) between base and emitter of the diode $D_1$ and transistors $Q_2$, $Q_3$ is neglected. The transistor $Q_3$ is interrupted while the voltage $v_L$ is lower than the input voltage $V_1$, therefore a base current of the transistor $Q_2$ flows through a resistance $R_1$. The transistor $Q_2$ is saturated by setting a resistance value of the resistance $R_1$ moderately low, and a voltage $V_{CE}$ between collector and emitter becomes almost zero. That is, the transistor $Q_2$ functions as a switching element to ON operation. Accordingly, $V_{01}$ and $v_L$ are equal. When $v_L$ increases to exceed $V_1$, the transistor $Q_3$ conducts, and thus the transistor $Q_2$ is interrupted. A capacitor $C_1$ is an element for preventing the transistor $Q_2$ from operating erroneously on a pulsative noise superposed on $v_L$ practically.

Figure 9:
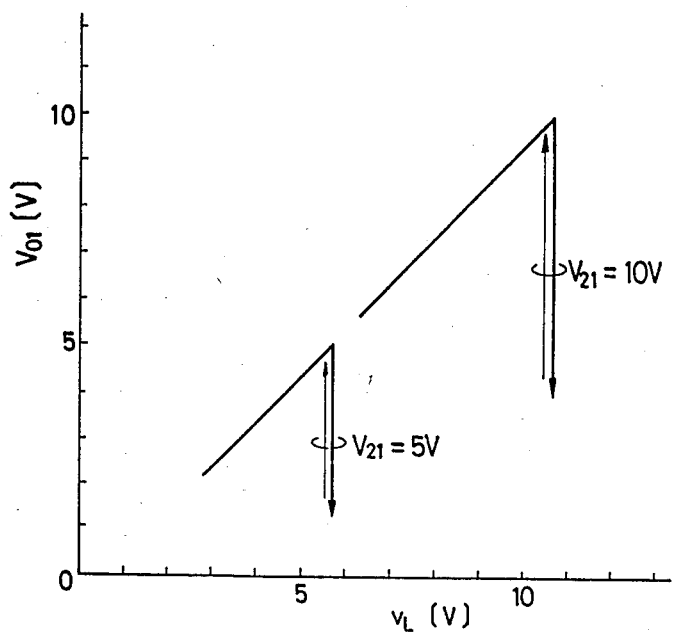
FIG. 9 is a view showing a result obtained through measuring a static characteristic of FIG. 8.

FIG. 9 is a view showing a result obtained through measuring a static characteristic of FIG. 8. The measurement was carried out for the cases where the input voltage $V_1$ was $5^v$ and $10^v$.

When $V_1 = 5^v$, $V_{01}$ increases in proportion linearly to $v_L$ while $v_L$ is low, indicating the transistor $Q_2$ being kept ON. When $v_L$ becomes approximately $5.5^v$, $V_{01}$ drops abruptly toward zero. That is, the situation that the transistor $Q_2$ has been interrupted is indicated thereby. The case is similar when $V_1$ is $10^v$.

Figure 10:
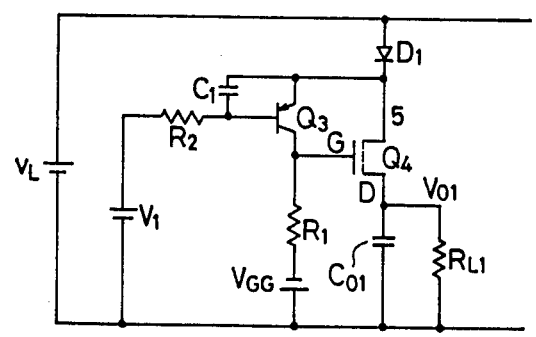
FIG. 10 is a circuit diagram showing a main part of another concrete embodiment of the present invention.

FIG. 10 represents the case where an enhancement type P-channel MOS transistor is used instead of the bipolar transistor $Q_2$ of FIG. 8. A reference character $V_{GG}$ denotes a power supply for gate biasing of a transistor $Q_4$, functioning to keep the transistor $Q_4$ on when the transistor $Q_3$ is kept OFF. The transistor $Q_3$ operates as in the case of FIG. 8. Then, a reference numeral 15 denotes a switching element.

Figure 11:
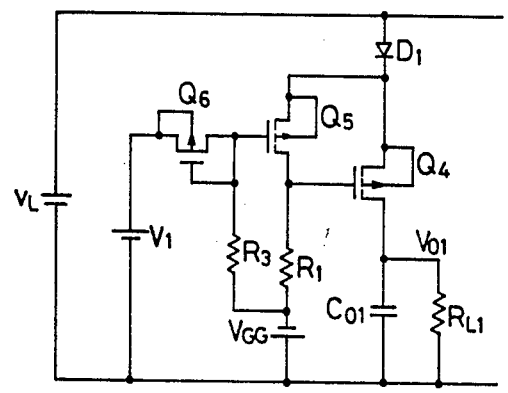
FIG. 11 is a circuit diagram showing a main part of a concrete further embodiment of the present invention.

FIG. 11 represents the case where the bipolar transistor $Q_3$ of FIG. 10 is replaced by a P-channel enhancement type MOS transistor of the same kind. A transistor $Q_6$ is also a MOS transistor of the same kind and has a threshold voltage generated between drain and source electrodes by a resistance $R_3$ and $V_{GG}$. Consequently, when source voltage of a transistor $Q_5$ (cathode voltage of the diode $D_1$) has just arrived at $V_1$, the transistor $Q_5$ conducts, the transistor $Q_4$ is short-circuited between source and gate to interrupt the transistor $Q_4$, and thus the circuit functioning similarly to the case of FIG. 8 is preferable as MOS.IC.

Figure 12:
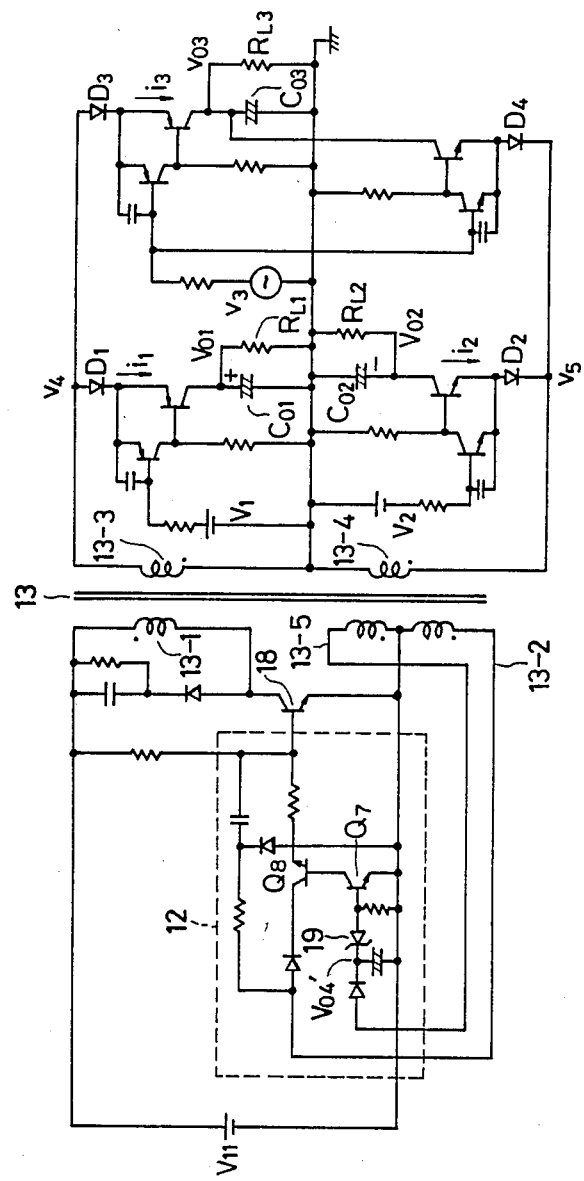
FIG. 12 is a circuit diagram of one example for which the invention is applied to a self-excited fly-back type DC to DC converter.

FIG. 12 represents one embodiment of the invention which is applied to an automatic fly-back type DC to DC converter.

The primary supply $V_{11}$ is switched by a transistor 18 through a primary coil 13-1 of the transformer 13. A reference numeral 12 denotes a base current control circuit of the transistor 18, controlling a base current with a current controlling transistor $Q_8$ interposed between a coil 13-2 and the base of the transistor 18. Then, the transistor $Q_8$ is controlled by a transistor $Q_7$.

Three channels ($V_{01}$, $V_{02}$, $V_{03}$) are provided for output. That is, $V_{01}$ represents a positive DC output, $V_{02}$ represents a negative DC output, and $V_{03}$ represents an AC output. To obtain positive and negative output voltages, there are provided two secondary coils 13-3 and 13-4 counter in polarity to each other. Each output switching circuit is identical to the construction of FIG. 8. In the AC output circuit, two switching circuits get into a push-pull operation. A positive half-wave of $v_{03}$ is obtained on the switching circuit through a diode $D_3$, while a negative half-wave is obtained on the switching circuit through a diode $D_4$. That is, the two switching circuits get into a class "B" push-pull operation. A rectifier circuit and coupled circuit 11 through a diode 14 of FIG. 6 is realized otherwise by a coil 13-5 and others in FIG. 12. That is, the voltage $V_{04}$ of FIG. 6 is obtained through rectifying an end voltage on 13-5 in the form of conversion. This is $V_{04}'$ and the voltage $V_{04}'$ is impressed on the base of the transistor $Q_6$ by way of a Zener diode 9. As a result, $V_{04}'$ is controlled so as to be fixed almost on a Zener voltage at all times. In other words, it functions equivalently to keep $V_{04}$ of FIG. 6 constant at all times irrespective of $V_1$ to $V_3$ and others.

Figure 13A:
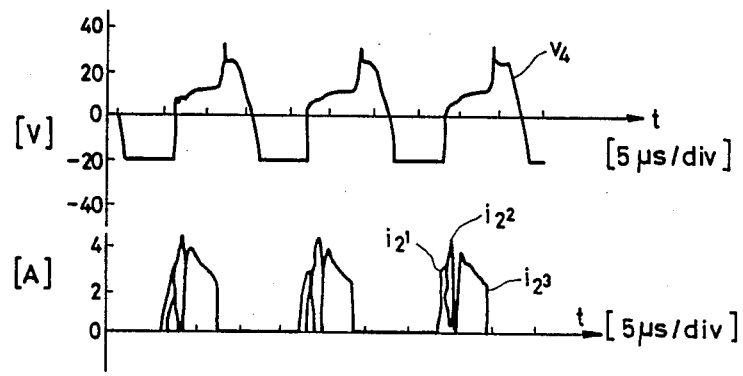
FIG. 13a and FIG. 13b are operational waveform diagrams of FIG. 12.
Figure 13B:
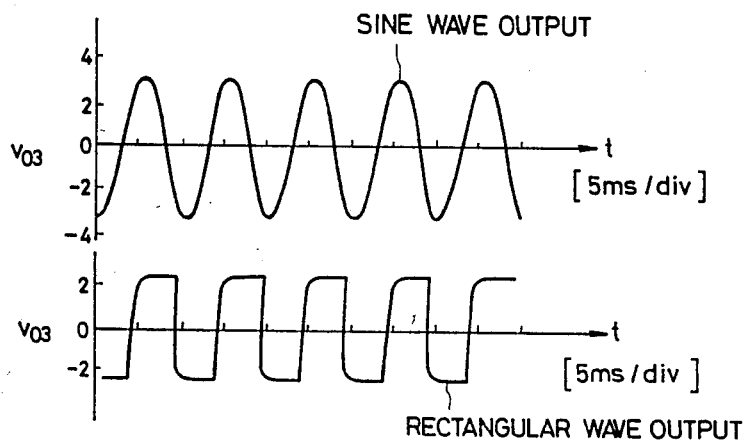

FIG. 13a and FIG. 13b are operational waveform drawings of FIG. 12. The three load impedances $R_{L1}$ to $R_{L3}$ are all 10Ω. An upper side waveform of FIG. 13a indicates a secondary coil voltage $v_4$, while a lower side waveform indicates that for which channel currents $i_1$ to $i_3$ are overlapped each. FIG. 13a shows waveforms at the time of $V_{01} = 1^v$, $V_{02} = -3^v$, $v_{03} = 7^v$.

When the $v_4$ waveform is negative, the diodes $D_1$ to $D_4$ on the secondary side are interrupted, and the primary switching element 8 is kept on during the period. When the primary switching element 8 is turned off, $v_4$ inverts in a positive direction, a channel with the lowest input voltage conducts at first, and then the currents flow in the order of input voltage magnitude, namely $i_1$, $i_2$, $i_3$ in that order.

FIG. 13b shows waveforms of $v_{03}$ when a sine wave and a square wave are inputted as $v_3$ of FIG. 12. In this case, $V_{01}$ and $V_{02}$ are kept at $+1^v$, $-3^v$ as in the case of FIG. 13a. This shows that DC and AC outputs are arbitrarily obtainable from outputs of the three channels.

A similar operation will be obtainable, needless to say, from adjusting the number of channels as occasion demands, or from using FET or other elements on each switching transistor. Further, the number of secondary coils will be increased, and a plurality of output channels may be connected to any of them wherever necessary.

Figure 14:
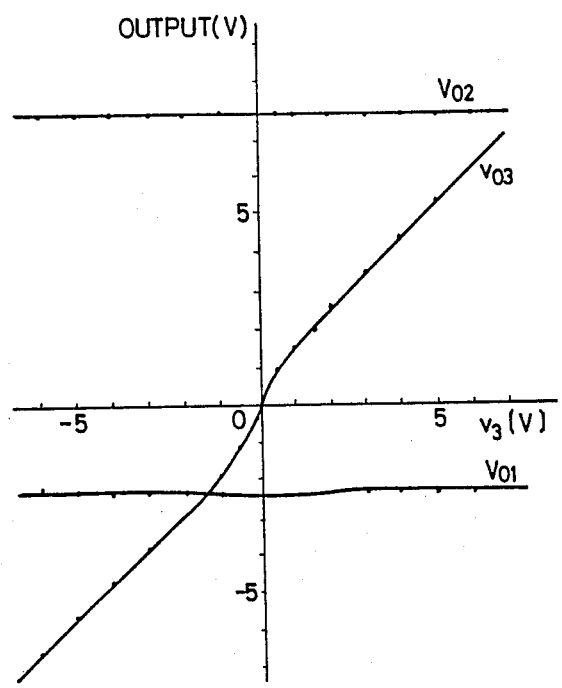
FIG. 14 is a view showing input/output static characteristics of FIG. 12.

FIG. 14 shows a result obtained through measuring input/output static characteristics. In the drawing, $v_{03}$ changes almost linearly against positive/negative change of $v_3$, and a gain is approximately 1. A curve around the origin is analogous to a crossover distortion of a conventional class "B" push-pull circuit, which can be improved by a means similar to the case of class "B" push-pull. Then, it is found that other channel outputs $V_{01}$, $V_{02}$ and others are free from influence according to the change of $v_{03}$.

Figure 15:
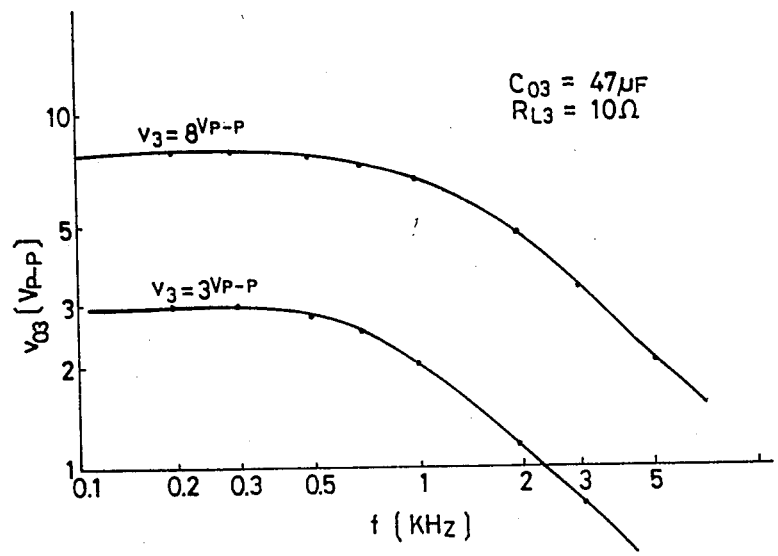
FIG. 15 is a view showing a result obtained through measuring a frequency characteristic.

FIG. 15 shows a result obtained through measuring a frequency characteristic of $v_{03}$. A high cut-off frequency depends on the smoothing capacitor $C_{03}$ and the load resistance $R_{L3}$. In this case, to decrease $C_{03}$ is to expand a pass band width. FIG. 15 indicates that the output channel can be utilized as an AC power amplifier.

Then, a power efficiency of the experimental circuit was about 70%. The value is equal to that of a normal switching regulator power source, which indicates that the invention well attains DC/AC multi-channeling without impairing the power efficiency of a prior art DC to DC converter.

FIG. 12 to FIG. 15 illustrate the embodiment of the invention using a fly-back type DC to DC converter.

As already described, FIG. 2a illustrates a principle operation identical to the aforementioned fly-back type, therefore the embodiment of the invention shown in FIG. 12 to FIG. 15 can be applied straight thereto.

Figure 3B:
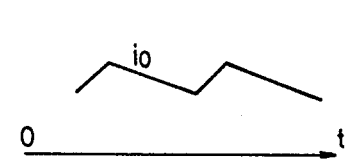

In the case of FIG. 3a, the output current flows continuously as shown in FIG. 3b quite different from that of FIG. 2a.

As one example of such circuitry, a second embodiment of the invention will be described with reference to FIG. 16.

Figure 16:
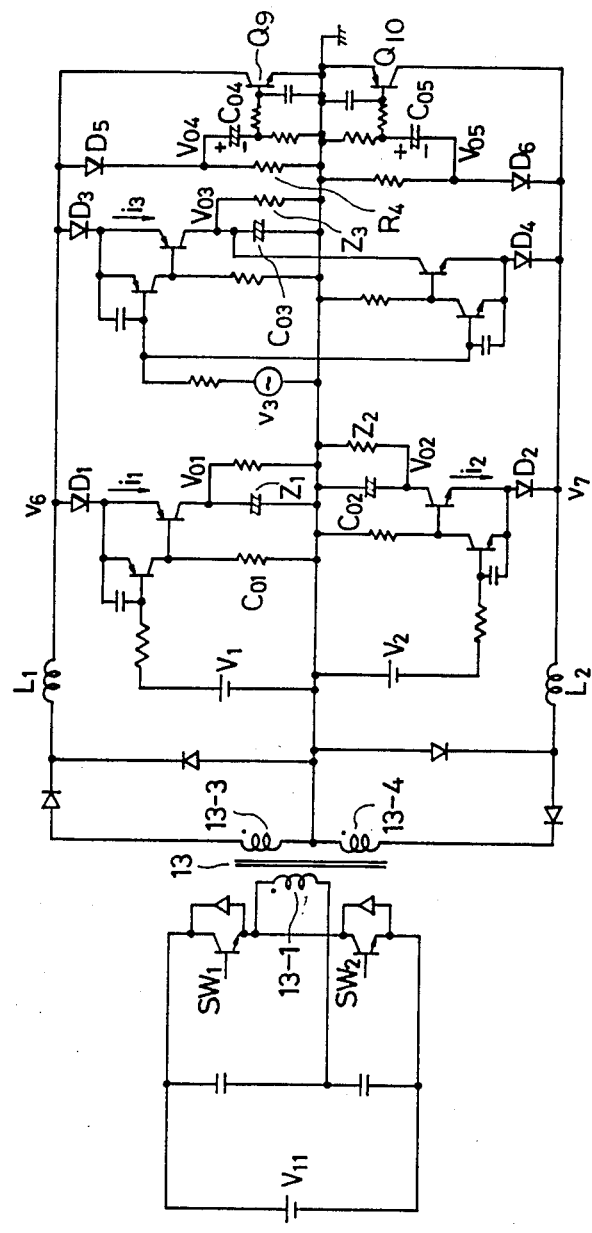
FIG. 16 is a circuit diagram of a further embodiment of the present invention.

In FIG. 16, if input currents are large in the order of, for example, $V_1$, $V_2$, $v_3$, then the channel currents flow in the order of $i_1$, $i_2$, $i_3$. As in the case of FIG. 12, the switching must be repeated again from the first after having made a round. In this case, since currents $L_1$, $L_2$ flow continuously at all times quite different from the case of FIG. 12, the cyclic repeat is not carried out automatically. As a method available therefor, when feeding to loads is completed after having made a round of all channels, an instantaneous ON operation will be effected, or $L_1$ and $L_2$ ends are short-circuited instantaneously after having made a round, and $L_1$, $L_2$ end voltages $v_6$ and $v_7$ may be stepped down. The latter method is employed in FIG. 16. For example, $V_{04}$ is set at voltage higher than $V_1$, $v_3$, therefore $D_5$ conducts after $i_1$, $i_3$ flow. The diode current drives a transistor $Q_9$ through $C_{04}$. The transistor $Q_9$ is interrupted at all times. As a result, $v_6$ drops and $D_1$ conducts on the way, thus returning to an initial state of the repeat. A transistor $Q_{10}$ operates likewise. The transistors $Q_9$, $Q_{10}$ may conduct sufficiently enough to drop $v_6$, $v_7$ and others, and hence are not necessarily saturated perfectly.

A spirit of the invention is included thoroughly in the above-described two embodiments, however, circuit configurations shown in FIG. 17 and FIG. 18 may be taken up below as examples somewhat simplified. FIG. 19 represents a prior art to FIG. 17. In FIG. 19 the DC voltage $V_0$ obtained through rectifying $v_L$ is used as power for amplifiers $A_3$, $A_4$ and others. Normally, $V_0$ is set to be larger than the maximum value of outputs $V_{01}$, $V_{02}$ and others. As a result, in case $V_{01}$, $V_{02}$, and others are much lower than $V_0$, a power consumption on $A_3$, $A_4$ and others becomes much larger than a power generated to the loads $R_{L1}$, $R_{L2}$ and others, and thus a power efficiency becomes exceedingly low.

Figure 17:
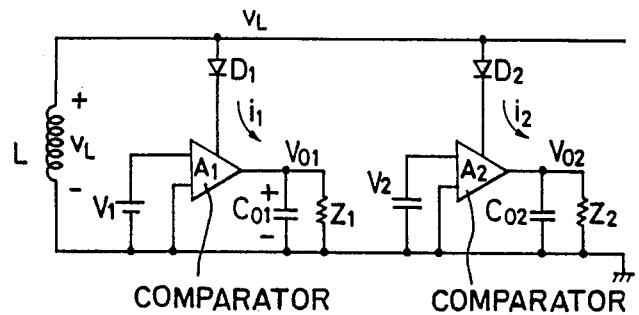
FIG. 17 and FIG. 18 are circuit diagrams of further simplified embodiments of the present invention each.

FIG. 17 represents an improvement of such low power efficiency. That is, for example, when $A_1$ conducts, a voltage drop arises from the inductance $L$ and thus $V_{01}$ lowers. If $V_{01}$ is lower than $V_{02}$ of the adjacent channel, then the diode $D_2$ is interrupted. When charging of the capacitor $C_{01}$ advances and $i_1$ decreases, $V_{01}$ rises to pass $i_2$.

During the period, $i_1$ keeps to flow somewhat, which is rather different from what has been described up to FIG. 15, however, since $v_L$ changes after the output voltages $V_{01}$, $V_{02}$ and so forth, the power efficiency is improved to a considerable extent as compared with FIG. 19.

Figure 18:
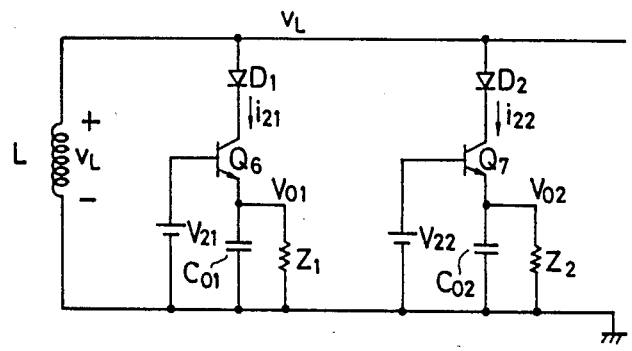
Figure 19:
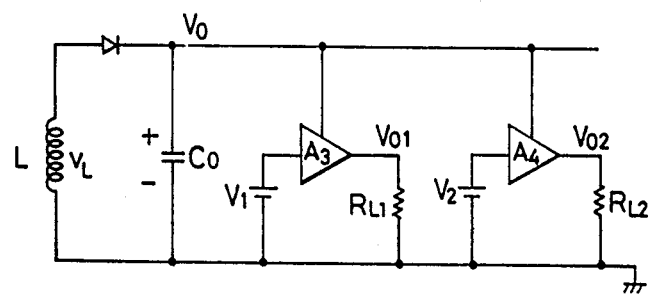
FIG. 19 is a circuit diagram of a prior art to FIG. 17.

FIG. 18 represents the case where an emitter follower is used as $A_1$, $A_2$ of FIG. 17. While the transistor $Q_6$ is saturated, $v_L$ becomes almost equal to $V_{01}$, and when charging of the capacitor $C_{01}$ advances and $i_{21}$ decreases, $v_L$ rises to make the transistor $Q_7$ alive.

Then, the invention can be applied likewise to circuits with reference to $D_3$, $D_4$ of FIG. 12 and $D_5$, $D_6$ and others of FIG. 16 for multi-channeling.

According to the embodiment of the invention described as above, the prior art DC to DC converter (switching regulator power source circuit) can be made to operate for DC and AC multi-channel outputting. That is, an apparatus multi-channeled, high in efficiency, miniaturized, lightweight and high in economical efficiency may be provided for DC and AC power amplifiers of PWM (pulse width modulation) systems.

Next, the invention will be applied to a conventional switching power circuit, and an embodiment of the apparatus thus obtained through multi-channeling an AC power amplifier having an output of both positive and negative polarities and also a substantial superiority in power efficiency of the switching power will be described with reference to FIG. 20 to FIG. 23. That is, in the embodiment given in FIG. 20, three kinds of output circuits are provided on the secondary side of a transformer 113. Then, an output channel 21 feeds a stable DC voltage to loads 24 and 25. An output channel 22 feeds a pulsating current voltage proportional to the magnitude of an input signal 38 to a load 26. Then, an output channel 23 feeds an AC voltage to a load 116. The primary side circuit of the transformer 113 forms a self-exciting oscillation circuit. That is, when a power switch 27 is closed, the base of a switching transistor (hereinafter called "switch element") 112 is fed from the primary supply 111 through a resistance 28, therefore the switch element 112 begins to conduct, and a voltage is induced on end of a coil 113-2 for driving the switch element 112. The voltage is transferred to the base of the switch element 112 through a resistance 29, and thus the switch element 112 is acceleratingly led to conduction with on state. Then, a collector current of the switch element 112, or a primary current of the transformer 113 is restricted by an inductance value of a primary coil 113-1 and increases linearly thereafter as time passes. However, a base current comes to a shortage before long, and a voltage between collector and emitter of the switch element 112 rises here. The voltage rise is transferred to the base of the switch element 112 through the coil 113-2 and the resistance 29 to interrupt the switch element 112. During the period of time for interruption, energy stored in the transformer 113 is discharged to the secondary side circuit. Accordingly, if any of switch elements 117, 118, 32, 33 of the output channels 21 to 23 is closed during the period, then the aforementioned energy will be inputted to the particular circuit.

Figure 22:
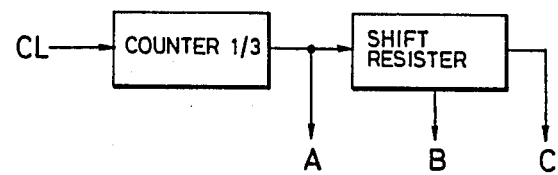
FIG. 22 and FIG. 23 are performance drawings of circuits shown in FIG. 21 and FIG. 20 each.
Figure 23:
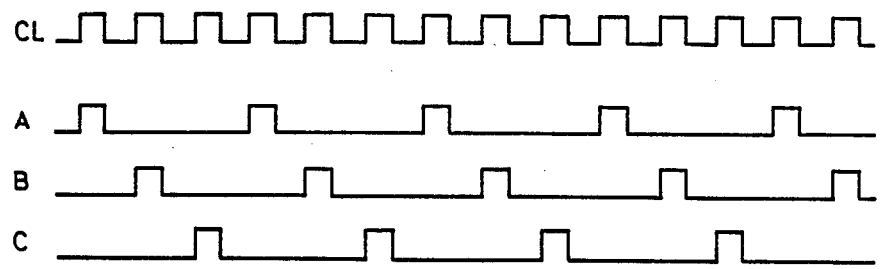

A quantity of the aforementioned energy is proportional to a peak value of the primary current of the transformer 113, and the peak value is proportional to a base current of the switch element 112. A reference numeral 30 denotes a control circuit of the base current, which is controlled by an output of primary-secondary coupled circuit 31. The primary secondary coupled circuit 31 comprises, for example, a photocoupler or the like, and an error voltage of each circuit on a secondary side is inputted thereto. That is, reference numerals 34, 35, 36-1 denote error amplifiers of the output channels 21 to 23 respectively. Differential voltages between voltages on output ends of the channels (ends of loads 6, 25, 26) and input voltages 39, 37, 38 of the channels are amplified and generated thereby, however, one of the error amplifier outputs is selected by changeover switches 40 to 42 and inputted to the primary-secondary coupled circuit 31. One of the output channels conducts correspondingly to a selection of the error voltages. A reference numeral 47 denotes a changeover control circuit, and its schematic construction and state are shown in FIG. 22 and FIG. 23. That is, with a signal CL generated on an end voltage of a coil 113-5 of the transformer 113 serving as a trigger, the changeover operation is carried out forward at every cycle indicated by A, B, C as shown in FIG. 22. Then, after being selected by the changeover switches 40 to 42 shown in FIG. 20 and FIG. 21, it is inputted to the primary-secondary coupled circuit 31.

The switch elements 32, 33 are driven on the end voltage of the coil 113-5 of the transformer 113. Switch elements 43, 44 are those for interrupting the driving voltage.

Switch elements 117 and 118 of the output channel 23 are driven by a Schmitt circuit 46. When an output of the Schmitt circuit 46 is plus, the switch element 117 conducts, and when minus, the switch element 118 conducts. The Schmitt circuit 46 is driven on an output of an error amplifier 36-2. When the output of the error amplifier 36-2 is minute, the output is fluctuated by noise, and thus the switch elements 117 and 118 are liable to conduct alternately, and hence the Schmitt circuit 46 is used for driving, a blind sector of the Schmitt circuit output being effective in removing an influence of the noise.

Then, diodes inserted in a circuit of each channel are those for inverting the switch element 112 from OFF to ON automatically of the aforementioned automatic oscillation operation. That is, when the secondary current becomes zero, the diodes are interrupted, therefore the secondary circuit is turned automatically off, and the primary switch element 112 is inverted from OFF to ON. If these diodes are not provided, then a control means for changing the switching elements 117, 118, 32, 33 and others to OFF at the proper point of time will be necessary.

In summarizing what has been described above, one of the output channels on a secondary side is selected in sequence at every cycle of ON/OFF operation of the primary switch element 112, and an ON time width of the primary switch element 112 is controlled on an error voltage of the particular channel.

Figure 20:
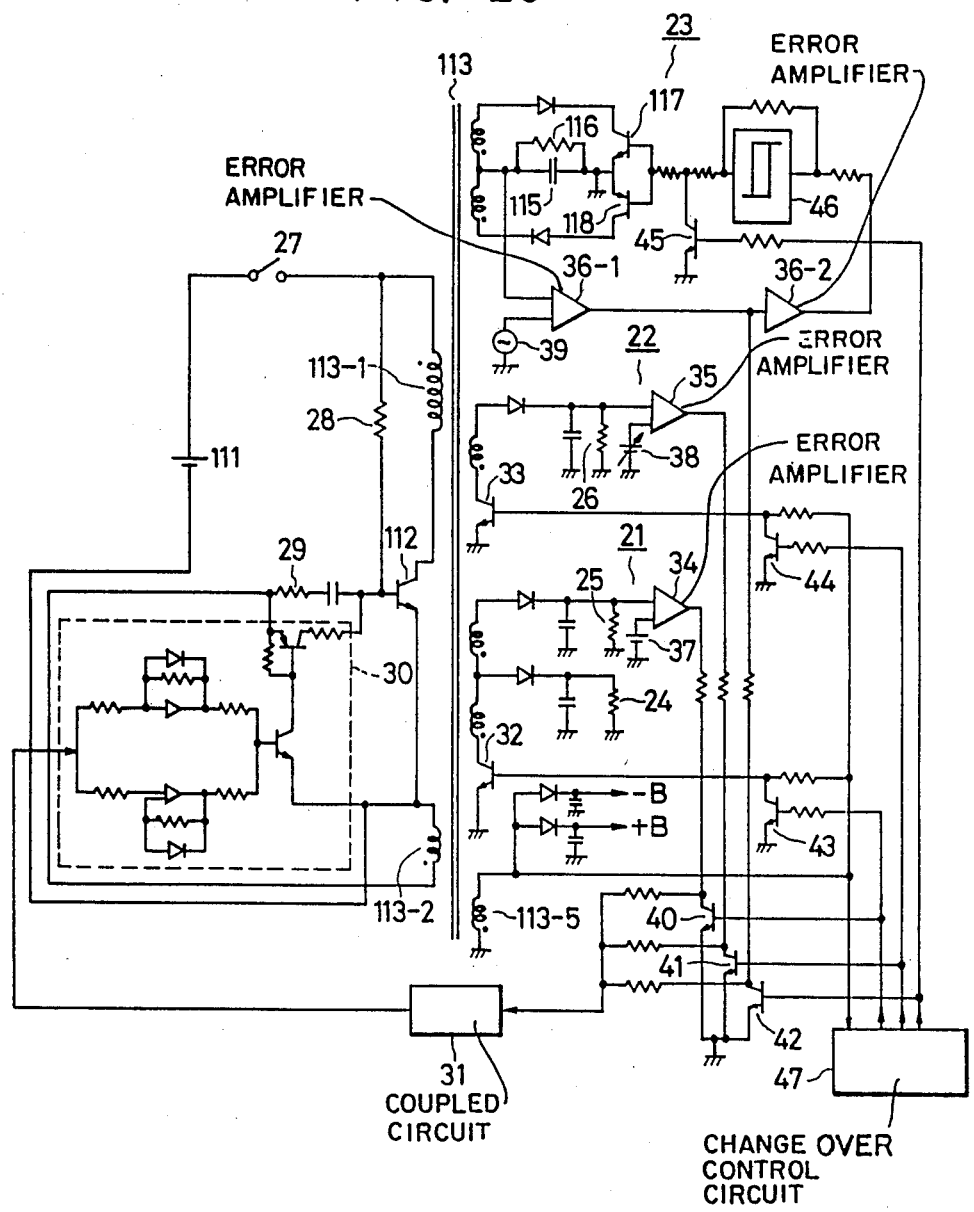
FIG. 20 is a circuit diagram showing a construction of one example of a multi-channel inverter according to the invention.
Figure 21:
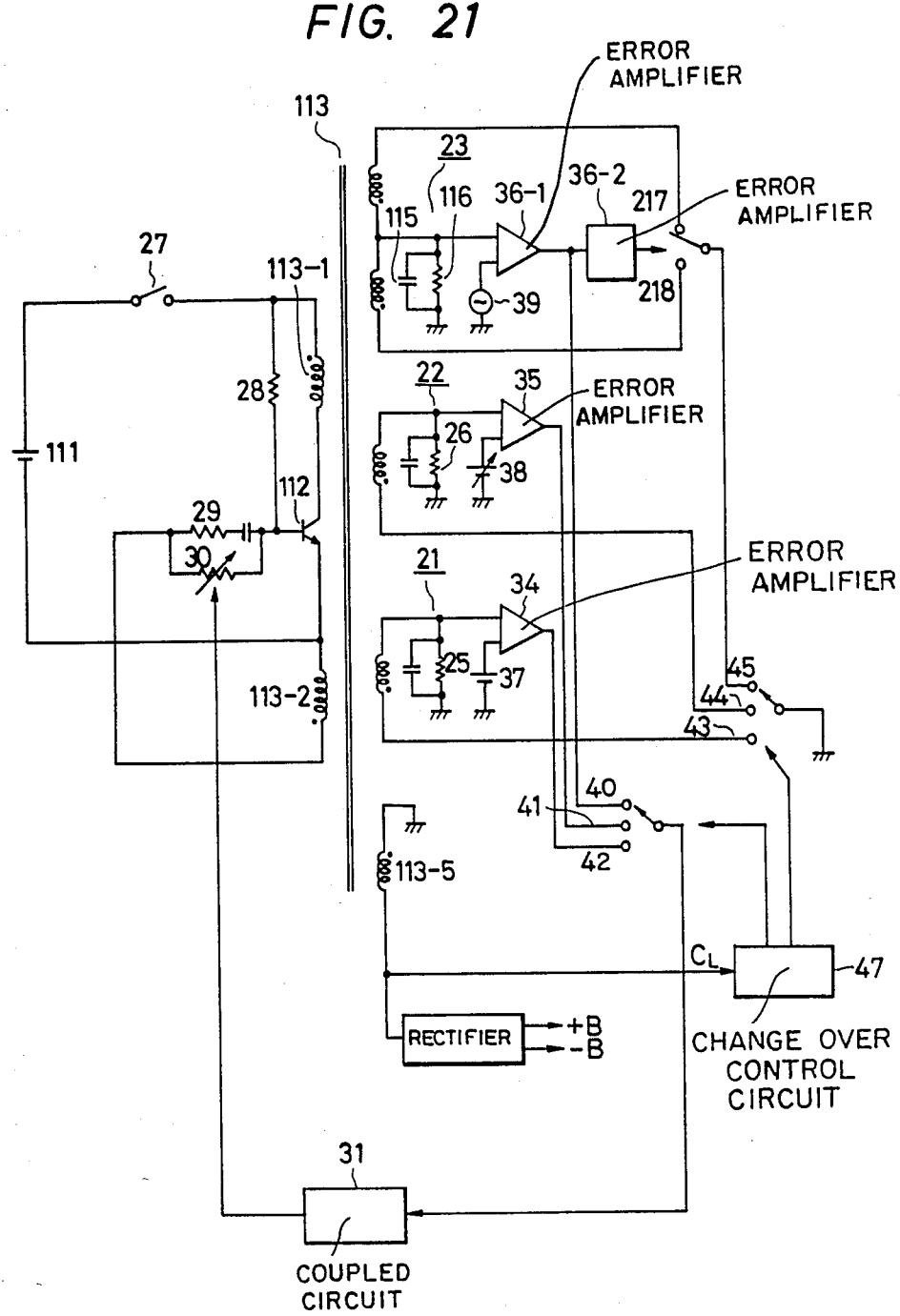
FIG. 21 is a schematic circuit configuration drawing of FIG. 20.

Then, in FIG. 20 and FIG. 21, the embodiment of the invention for which a self-excited fly-back type switching circuit is an objective has been described, however, it is apparent that an effect of the invention similar to the above-described embodiment will be obtainable from applying contents of the summary mentioned above also in other switching circuits irrespective of self-excited and separately-excited.

Described next is another embodiment of the invention, whereby the foregoing disadvantage is improved by setting output supply voltages of the channels independently other than the above-described construction.

Figure 24:
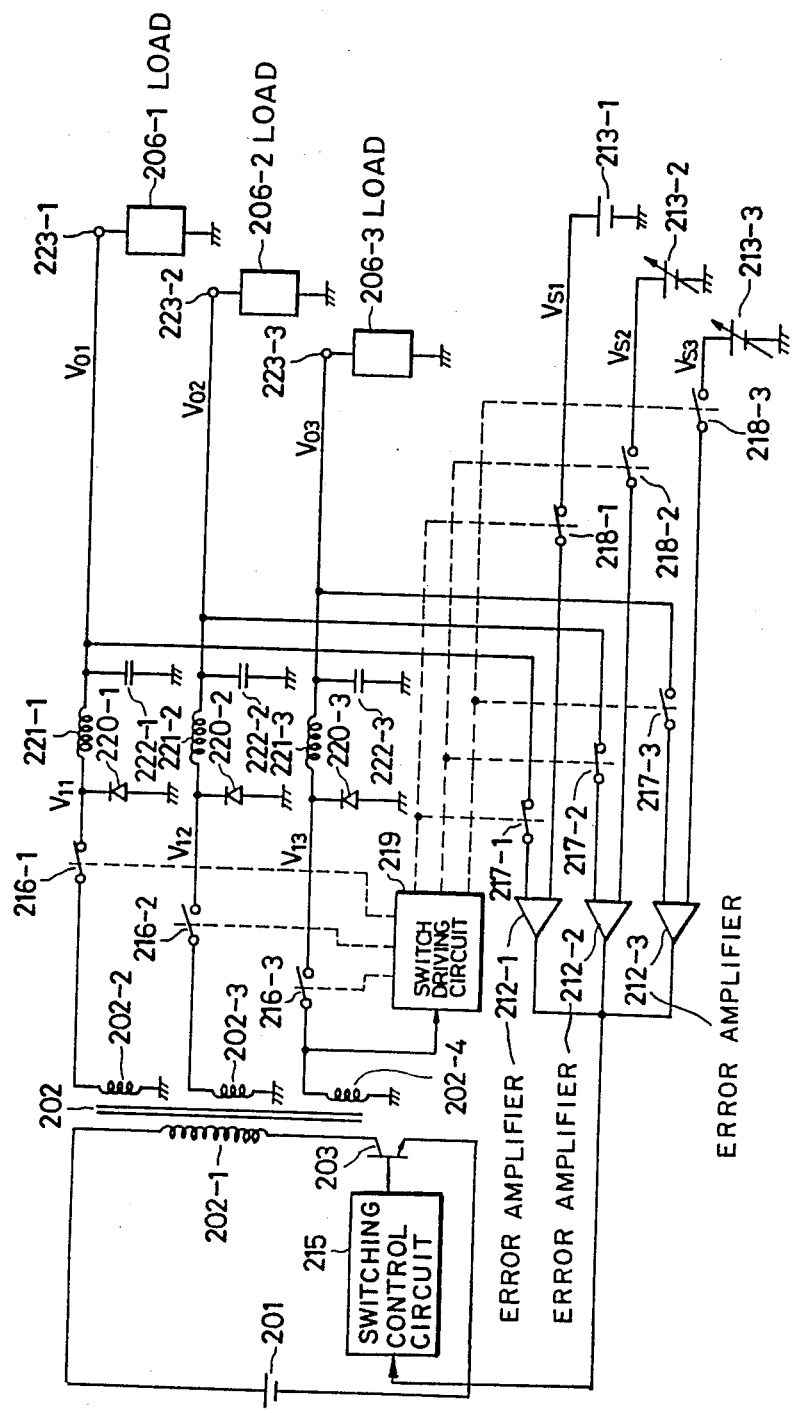
FIG. 24 is a circuit diagram showing a construction of another embodiment of the invention.

FIG. 24 is a block diagram representing one embodiment of a multi-channel switching power circuit according to the invention, wherein 206-1 to 206-3 denote loads, 212-1 to 212-3 denote error amplifiers, 213-1 to 213-3 denote reference power sources, 216-1 to 216-3, 217-1 to 217-3, 218-1 to 218-3 denote switches, 219 denotes a switch driving circuit, 220-1 to 220-3 denote fly-back diodes, 221-1 to 221-3 denote secondary choke coils, 222-1 to 222-3 denote smoothing capacitors, 223-1 to 223-3 denote output terminals.

In the drawing, now let it be assumed that the loads 206-1 to 206-3 are connected to the output terminals 223-1 to 223-3 respectively, and a supply voltage is fed to each of them.

A switching element 203 is controlled by a switching control circuit 215 for ON/OFF operation, and in ON interval of the switching element 203, a voltage pulse of amplitude determined on the winding ratio to a primary coil 202-1 is generated on secondary coils 202-2, 202-3, 202-4 of a transformer 202. The embodiment is a forward type, and by a switch driving circuit 219, the switch 216-1 is closed in every two ON intervals of the switching element 203, the switch 216-2 is closed in the next every two ON intervals, and the switch 216-3 is closed in the further every two ON intervals. That is, the switches 216-1, 216-2, 216-3 are closed in that order every time the switching element 203 is turned on.

Figure 25:
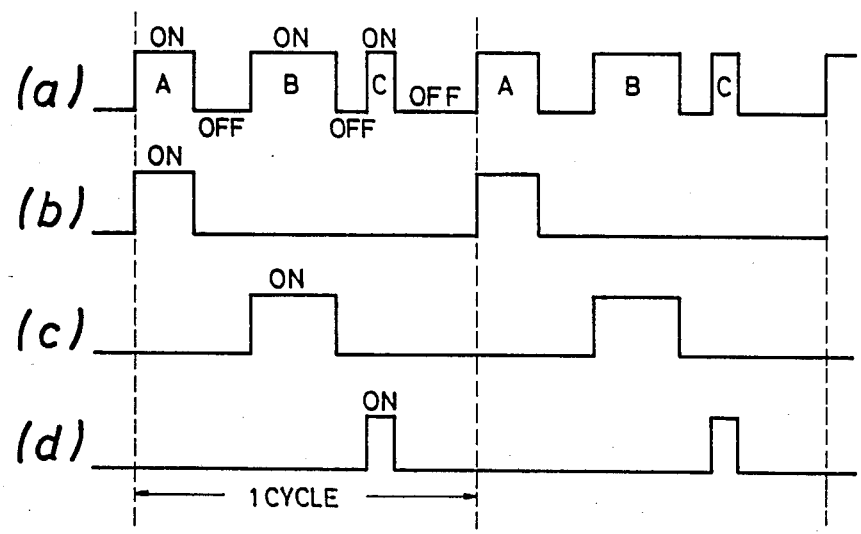
FIG. 25, FIG. 26 and FIG. 27 are operational drawings of the example illustrated in FIG. 24.

Referring now in detail to FIG. 25, FIG. 25(a) shows ON/OFF operation of the switching element 203, one cycle operation coming in three ON's and OFF's. Let the first ON interval of each cycle be A, the next ON interval be B, and the last ON interval be C, then, as shown in FIG. 25(b), the switch 216-1 closes in ON interval A of each cycle, and the switch 216-2 closes in ON interval B likewise as shown in FIG. 25(c), the switch 216-3 closes in ON interval C likewise as shown in FIG. 25(d).

Accordingly, the switch 216-1 extracts every two voltage pulses of those which are generated on the secondary side of the transformer according to ON/-OFF operation of the switching element 203, the switch 216-2 extracts the next every two voltage pulses, and the switch 216-3 extracts the further ever two voltage pulses. The voltage pulse extracted by the switch 216-1 is converted into a DC voltage through the fly-back diode 220-1, the secondary choke coil 221-1, the smoothing capacitor 222-1, and is impressed on the load 206-1 connected to the output terminal 223-1 as supply voltage $V_{01}$. Similarly, the voltage pulse extracted by the switch 216-2 is converted into a DC voltage, impressed on the load 206-2 connected to the output terminal 223-2 as supply voltage $V_{02}$, and the voltage pulse extracted by the switch 216-3 is also converted into a DC voltage, impressed on the load 206-3 connected to the output terminal 223-3 as supply voltage $V_{03}$.

On the other hand, the switches 217-1, 218-1 are turned on/off on the same timing as the switch 216-1 by the switch driving circuit 219 (FIG. 25(b)), the switches 217-2, 218-2 are turned on/off on the same timing as the switch 216-2 (FIG. 25(c)), and the switches 217-3, 218-3 are turned on/off on the same timing as the switch 216-3 (FIG. 25(d)).

Thus, for controlling the switches 216-1 to 216-3, 217-1 to 217-3, 218-1 to 218-3 for ON/OFF operation, the switch driving circuit 219 puts in, for example, a forward voltage pulse generated on the secondary coil 202-4, feeds a voltage pulse generated in ON interval A of the switching element 203 of FIG. 25(a) to the switches 216-1, 217-1, 218-1 as switching pulse, feeds a voltage pulse generated in the next ON interval B to the switches 216-2, 217-2, 218-2, and also feeds a voltage pulse generated in the further ON interval C to the switches 216-3, 217-3, 218-3. Thus, the switches 216-1 to 2163, 217-1 to 217-3, 218-1 to 218-3 are turned on/off by feeding the voltage pulse generated on the secondary coil 202-4 to each switch by turns.

In ON intervals of the switches 217-1, 218-1, the supply voltage $V_{01}$ obtained on the output terminal 223-1 and a standard voltage $V_{S1}$ of the reference supply 213-1 are fed to the error amplifier 212-1 to a magnitude comparison, and the error voltage is fed to the switching control circuit 215. Then, in ON intervals of the switches 217-2, 218-2, the supply voltage $V_{02}$ obtained on the output terminal 223-2 and a standard voltage $V_{S2}$ of the reference supply 213-2 is fed to the error amplifier 212-2 to a magnitude comparison, and the error voltage is also fed to the switching control circuit 215. Similarly, in ON intervals of the switches 217-3, 218-3, the supply voltage $V_{03}$ obtained on the output terminal 223-3 and a standard voltage $V_{S3}$ of the reference supply 213-3 are fed to the error amplifier 212-3 to a magnitude comparison, and the error voltage is fed to the switching control circuit 215. The switching control circuit 215 comprises a self-excited oscillator, and a pulse width of the output pulse changes according to error voltages from the error amplifiers 212-1 to 212-3.

Now, therefore, when the switches 216-1, 217-1, 218-1 are closed and an error voltage is fed to the switching control circuit 215 from the error amplifier 212-1, a pulse is fed to the switching element 203 from the switching control circuit 215 then and the switching element 203 is also turned on (ON interval A of FIG. 25(a)), however, a width of the pulse makes a change according to the error voltage fed to the switching control circuit 215, and the switching element 203 and the switches 216-1, 217-1, 218-1 keep on by the pulse width. Accordingly, a voltage pulse of the time width equal to the pulse width generated from the switching control circuit 215 is obtained through the switch 216-1.

When the switching control circuit 215 outputs the next pulse, the switching element 203 is turned on and also the switches 216-2, 217-2, 218-2 are turned on (ON interval B of FIG. 25(a)), an error voltage is fed from the error amplifier 212-2 to the switching control circuit 215. A width of the output pulse of the switching control circuit 215 makes a change according to the error voltage, and the switching element 203 and the switches 216-2, 217-2, 218-2 are turned on for an interval of the pulse width. Accordingly, a voltage pulse of the time width equal to the pulse width is obtained through the switch 216-2.

Similarly, when the next pulse of the switching control circuit 215 is generated (ON interval C of FIG. 25(a)), an error voltage is fed from the error amplifier 212-3 to the switching control circuit 215, and a voltage pulse of the time width corresponding to the error voltage is obtained through the switch 216-3.

Thus, every time a pulse is generated from the switching control circuit 215, the error voltage is fed to the switching control circuit 215 from the error amplifiers 212-1, 212-2, 212-3 in that order, a voltage pulse of the time width corresponding to the error voltage generated from the error amplifier 212-1 is obtained through the switch 216-1, and a voltage pulse of the time width corresponding to the error voltage generated from the error amplifiers 212-2, 212-3 is obtained through the switches 216-2, 216-3.

Now, let it be assumed that amplitudes of the voltage pulses from the switches 216-1, 216-2, 216-3 are $V_{11}$, $V_{12}$, $V_{13}$ respectively, ON intervals of the switches are $T_{ON1}$, $T_{ON2}$, $T_{ON3}$, and OFF intervals are $T_{OFF1}$, $T_{OFF2}$, $T_{OFF3}$, then the supply voltages $V_{01}$, $V_{02}$, $V_{03}$ obtained on the output terminals 223-1, 223-2, 223-3 may be expressed as:

$$V_{01} = V_{11} \cdot \frac{T_{ON1}}{T_{ON1} + T_{OFF1}}$$

$$V_{02} = V_{12} \cdot \frac{T_{ON2}}{T_{ON2} + T_{OFF2}}$$

$$V_{03} = V_{13} \cdot \frac{T_{ON3}}{T_{ON3} + T_{OFF3}}$$

When the supply voltage $V_{01}$ is not equal to the standard voltage $V_{S1}$ of the reference supply 213-1, an error voltage is generated from the error amplifier 212-1.

Similarly, when the supply voltages $V_{O2}$, $V_{O3}$ are not equal to the standard voltages $V_{S2}$, $V_{S3}$ of the reference supplies 213-2, 213-3, an error voltage is generated from the error amplifiers 212-2, 212-3. Further, since the error voltages change a width of the separate pulse from the switching control circuit 215, and the switches 216-1 to 216-3 are turned on by the time of width of pulses different from each other, the supply voltage $V_{O1}$ becomes equal to the reference voltage $V_{S1}$ of the reference supply 213-1, the supply voltage $V_{O2}$ because equal to the reference voltage $V_{S2}$ of the reference supply 213-2, and the supply voltage $V_{O3}$ becomes equal to the reference voltage $V_{S3}$ of the reference supply 213-3, likewise. Further, for example, if the reference voltages $V_{S2}$, $V_{S3}$ of the reference supplies 213-2, 213-3 are made variable, the supply voltages $V_{O2}$, $V_{O3}$ can be changed arbitrarily and independently of each other without exerting an influence on other supply voltages.

Accordingly, when the loads 206-2, 206-3 are made available by controlled equipment such as servomotor or the like, the supply voltages $V_{O2}$, $V_{O3}$ can be fed directly thereto, the reference voltages $V_{S2}$, $V_{S3}$ are made to change, thus the controlled equipment can be controlled, and a servo circuit provided hitherto is not necessary. Thus, requirements for low power consumption, miniaturization and low cost of apparatuses using the embodiment can be attained. Further, even if a rush current flows in the load 206-2 working as a servomotor at the time of start-up, then since the switch 216-2 is turned off, or other switches 216-1, 216-3 are turned off if the switch 216-2 is on, no fluctuation will result on other supply voltages $V_{O1}$, $V_{O3}$.

Figure 26:
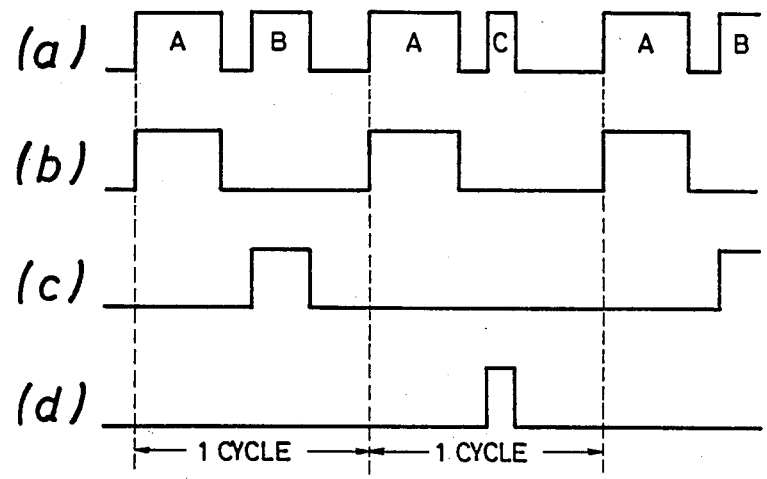

In FIG. 24 when power to be fed to the load 206-1 must be secured, for example, large enough as compared with the loads 206-2, 206-3, the switch 216-1 may be turned frequently on as compared with the switches 216-2, 216-3. For example, when the switching element 203 operates as shown in FIG. 26(a), the switch 216-1 is turned on in every one ON interval A of the switching element 203 as shown in FIG. 26(b), and other switches 216-2, 216-3 may be turned on in every three ON intervals B, C of the switching element 203 as shown in FIGS. 26(c) and (d). Needless to say, the switches 216-1, 216-2, 216-3 may be operated on the timing shown in FIG. 25, however, there arises a big difference in ON intervals of the switches. If the timing shown in FIG. 26 is employed, then the aforementioned difference will be not so extreme, and a circuit design becomes easy.

Figure 27:
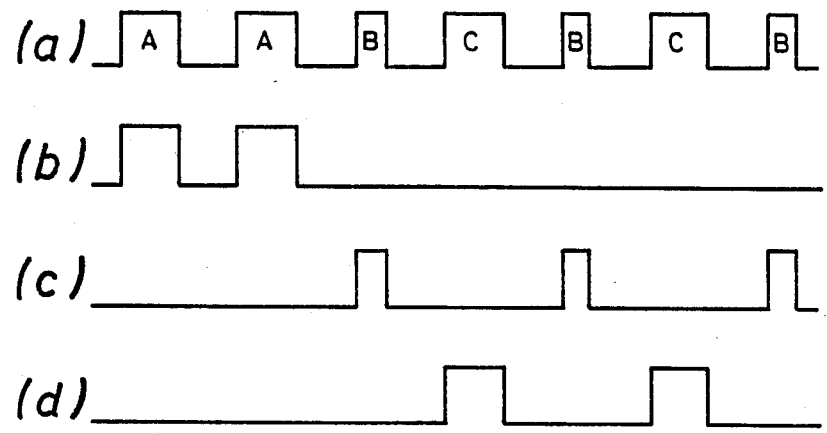

Then, in a system requiring a start-up power, where other supply voltages are not required while a start-up supply voltage is generated, the above-described embodiment can be applied. That is, at the time of start-up of the system, only the switch 216-1 is turned on/off (FIG. 27(b)) synchronously with operation (FIG. 27(a)) of the switching element 203, and a start-up supply voltage is generated on the output terminal 223-1. After the system starts up, the switch 216-1 is kept off, and as shown in FIGS. 27(c) and (d), the switches 216-2 and 216-3 are turned on alternately synchronously with ON interval of the switching element. Thus, a predetermined supply voltage is obtainable on the output terminals 223-2, 223-3. Since an output of the start-up supply voltage can be stopped after start-up of the system, power consumption can be decreased, and a reasonable design can be realized.

Then in the above description, the switches 217-1 to 217-3, 218-1 to 218-3 are synchronized with the switches 216-1 to 216-3, however, a storage will be provided on the rear stage of each of the error amplifiers 212-1 to 212-3 for storing the respective error voltages therein, the switching control circuit 215 will then load in error voltages by turns from the storage synchronously with an output of the pulse, and thus the switches 217-1 to 217-3, 218-1 to 218-3 need not be synchronized with the switches 216-1 to 216-3.

Further, the switches 217-1 to 217-3, 218-1 to 218-3 may be omitted and the error amplifiers 212-1 to 212-3 will operate normally for comparison, a selector switch will be provided on the rear stage of each of the error amplifiers 212-1 to 212-3, and thus the switching control circuit 215 may load in error voltages by turns from the error amplifiers 212-1 to 212-3.

The invention can be applied generally for DC power source and also effectively for a power amplifier driving motors and various types of actuators. For example, in the field requiring servo-amplifiers and actuator driving circuits other than the circuit system such as VTR, VDD, robotic system, car electronic equipment and the like, a satisfactory power efficiency overwhelms a problem of radiation, and advantages of small size and light weight improve many problems on packaging and expand a degree of freedom of design, to say nothing of economical efficiency.

Then, an advantage is that the system can be easily standardized. That is, the output channel switch circuit operates automatically not on control signals from others, therefore the output channel number can be adjusted arbitrarily. Accordingly, the standardized body and the unitized output channel switch circuit may be combined to satisfy a multiplicity of uses, and an economical effect by standardization can be expected.

Further, as a simple example of the effect, an output voltage of the DC stabilizing power unit on the market is made variable continuously to positive and negative polarities, and further made available in multiple power to enhance a value of merchandise.

According to the invention, in a switching unit for obtaining a secondary output of multi-channel, outputs of AC, pulsating current and the like other than a conventional DC output, therefore a power circuit system economical, superior in power efficiency, small-sized and lightweight, wherein DC and AC power amplifier circuits in the circuit system are omitted, and the function is employed to the switching unit will be obtainable.

Further, according to the invention, in addition to the aforementioned effect, supply voltages to be fed to a plurality of loads can be controlled independently of each other, a mutual interference between the supply voltages can be removed, and thus a multi-channel switching circuit with a superior function can be provided by solving the problems prevailing with the prior art.

What is claimed is:

1. A multi-channel inverter circuit, comprising a primary circuit equipped with a primary power supply, a primary inductance and a primary switching means;

a secondary circuit comprising a secondary inductance coupled inductively to said primary inductance, and a plurality of output channel circuits each having a first capacitor, a secondary switching means and a load circuit provided at least at each said output channel circuit;

wherein electrical energy generated on said primary circuit is transferred in sequence to the load circuit provided at every output channel circuit of said second circuit through a coupling of said primary inductance and secondary inductance, in a sum total of switching time width determined for the output channel circuits by the primary switching means.

2. A multi-channel inverter circuit as defined in claim 1, wherein an input voltage of the secondary circuit and a control voltage for controlling the secondary switching means are compared at the output channel circuits, the switching time width of said secondary switching means being controlled according to a comparison output at the output channel circuits, outputs of said secondary circuit being fed to the load of the output channel circuits.

3. A multi-channel inverter circuit as defined in claim 2, wherein a signalling means for comparing an input voltage of said secondary circuit with a control voltage for controlling the secondary switching means at the output channel circuits to control the secondary switching means comprises a comparator.

4. A multi-channel inverter circuit as defined in claim 1, further comprising a means for controlling a switching time of the primary circuit through a coupled circuit on an end voltage of a second capacitor of the secondary circuit, the first capacitor and the load circuit connected in parallel to said second capacitor at the output channel circuit, and
a circuit of a diode in series with the second capacitor parallely connected with a resistance.

5. A multi-channel inverter circuit as defined in claim 1, further comprising a detecting circuit for detecting a peak value of a rectifier output voltage of the multi-channel inverter circuit, and a means for controlling a switching time of said primary circuit according to the output voltage of said detecting circuit.

6. A multi-channel inverter circuit as defined in claim 1, further comprising an amplifier with the secondary circuit comprising a capacitor and a load at the output channel circuits, outputs resulting from rectification of said secondary circuit input being connected to each of said amplifiers.

7. A multi-channel inverter as defined in claim 1, further comprising a peak value detection circuit for detecting the peak value of a rectifier output voltage of said secondary circuit,
a switching circuit for short-circuiting said rectifier output terminal, and
a means for driving said rectifier output short-circuit switching circuit on a output of said peak value detection circuit.

8. A multi-channel inverter circuit as defined in claim 1, wherein a plurality of switching time widths of the primary switching means are determined through summarily changing in sequence by means of a differential voltage comparison obtained through comparing an output voltage of the output channel circuits in the secondary circuit with an input signal voltage supplied to the output channel circuits.

9. A multi-channel inverter circuit as defined in claim 1, wherein the secondary switching means includes means for obtaining outputs through synchronizing with the primary circuit and rectifying the secondary inductance voltage,
comprising a push-pull circuit means to the primary switching means and the secondary switching means, the push-pull circuit means being provided with a switching change-over circuit for selectively operating a switching circuit of said push-pull circuit means.

* * * * *